(12) United States Patent
Smith et al.

(10) Patent No.: US 12,093,339 B1
(45) Date of Patent: *Sep. 17, 2024

(54) METHODS AND SYSTEMS FOR PROVIDING A DOCUMENT

(71) Applicant: Google LLC, Mountain View, CA (US)

(72) Inventors: Adam Douglas Smith, San Francisco, CA (US); Amin Zoufonoun, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,470

(22) Filed: Mar. 16, 2022

Related U.S. Application Data

(60) Continuation of application No. 16/290,677, filed on Mar. 1, 2019, now Pat. No. 11,301,537, which is a continuation of application No. 14/248,230, filed on Apr. 8, 2014, now Pat. No. 10,223,470, which is a continuation of application No. 13/193,572, filed on
(Continued)

(51) Int. Cl.
| | |
|---|---|
| *G06Q 10/10* | (2023.01) |
| *G06F 16/93* | (2019.01) |
| *G06F 16/958* | (2019.01) |
| *G06Q 10/06* | (2023.01) |
| *G06Q 30/02* | (2023.01) |
| *G06Q 30/06* | (2023.01) |
| *G06Q 50/00* | (2012.01) |

(52) U.S. Cl.
CPC ............ *G06F 16/958* (2019.01); *G06F 16/93* (2019.01); *G06Q 30/02* (2013.01); *G06Q 50/01* (2013.01)

(58) Field of Classification Search
CPC ....... G06F 16/958; G06F 16/93; G06Q 30/02; G06Q 50/01
USPC .......................................... 705/1.1–912, 319
See application file for complete search history.

(56) References Cited

U.S. PATENT DOCUMENTS

| | | |
|---|---|---|
| 5,287,498 A | 2/1994 | Perelman et al. |
| 5,537,586 A | 7/1996 | Amran et al. |

(Continued)

FOREIGN PATENT DOCUMENTS

| | | |
|---|---|---|
| CN | 1949220 | 4/2007 |
| JP | 11265369 | 9/1999 |

(Continued)

OTHER PUBLICATIONS

"Mufin.com: content-based recommendations," Net, Blogs and Rock'n'Roll, Oct. 8, 2008, retrieved from http://www.netblogsrocknroll.com/2008/10/mufin-music-fin.html on May 13, 2009, 6 pgs.

(Continued)

*Primary Examiner* — Jonathan P Ouellette
(74) *Attorney, Agent, or Firm* — Fish & Richardson P.C.

(57) ABSTRACT

Systems and methods for providing a document are described. In one described method, a document comprising a portion selected by a first member of a social network is hosted for the first member. The portion is dynamically updated with content. An audience criterion for the portion and a type of relationship between the first member and a second member of the social network are identified. If the type of relationship between the first member and the second member satisfies the audience criterion, the second member is provided access to at least the portion.

20 Claims, 6 Drawing Sheets

Related U.S. Application Data

Jul. 28, 2011, now Pat. No. 8,719,177, which is a division of application No. 10/911,075, filed on Aug. 3, 2004, now Pat. No. 8,015,019.

(56) References Cited

U.S. PATENT DOCUMENTS

| | | | |
|---|---|---|---|
| 5,796,393 A | 8/1998 | MacNaughton et al. | |
| 5,950,200 A | 9/1999 | Sudai et al. | |
| 5,963,951 A | 10/1999 | Collins | |
| 6,041,311 A | 3/2000 | Chislenko et al. | |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A | 6/2000 | de l'Etraz et al. | |
| 6,092,049 A | 7/2000 | Chislenko et al. | |
| 6,130,938 A | 10/2000 | Erb | |
| 6,192,119 B1 | 2/2001 | Wilson | |
| 6,256,648 B1 | 7/2001 | Hill et al. | |
| 6,285,999 B1 | 9/2001 | Page | |
| 6,327,590 B1 | 12/2001 | Chidlovskii | |
| 6,366,962 B1 | 4/2002 | Teibel | |
| 6,389,372 B1 | 5/2002 | Glance et al. | |
| 6,421,678 B2 | 7/2002 | Smiga et al. | |
| 6,442,567 B1 | 8/2002 | Retallick et al. | |
| 6,594,673 B1 | 7/2003 | Smith et al. | |
| 6,658,423 B1 | 12/2003 | Pugh et al. | |
| 6,665,715 B1 | 12/2003 | Houri | |
| 6,678,681 B1 | 1/2004 | Brin | |
| 6,697,478 B1 | 2/2004 | Meldrum et al. | |
| 6,754,322 B1 | 6/2004 | Bushnell | |
| 6,782,425 B1 | 8/2004 | Germscheid | |
| 6,799,176 B1 | 9/2004 | Page | |
| 6,834,195 B2 | 12/2004 | Brandenberg et al. | |
| 6,837,436 B2 | 1/2005 | Swartz et al. | |
| 6,865,546 B1 | 3/2005 | Song | |
| 6,871,186 B1 | 3/2005 | Tuzhilin et al. | |
| 6,895,406 B2 | 5/2005 | Fables et al. | |
| 6,912,505 B2 | 6/2005 | Linden et al. | |
| 6,963,850 B1 | 11/2005 | Bezos et al. | |
| 7,013,292 B1 | 3/2006 | Hsu et al. | |
| 7,069,308 B2 | 6/2006 | Abrams | |
| 7,080,117 B2 | 7/2006 | De Pinto | |
| 7,092,821 B2 | 8/2006 | Mizrahi et al. | |
| 7,106,848 B1 | 9/2006 | Barlow et al. | |
| 7,110,983 B2 | 9/2006 | Shear | |
| 7,113,917 B2 | 9/2006 | Jacobi et al. | |
| 7,117,254 B2 | 10/2006 | Lunt et al. | |
| 7,130,777 B2 | 10/2006 | Garg | |
| 7,130,844 B2 | 10/2006 | Elder et al. | |
| 7,139,252 B2 | 11/2006 | Babu et al. | |
| 7,155,608 B1 | 12/2006 | Malik et al. | |
| 7,177,904 B1 | 2/2007 | Mathur et al. | |
| 7,188,153 B2 | 3/2007 | Lunt | |
| 7,225,249 B1 | 5/2007 | Barry | |
| 7,234,117 B2 | 6/2007 | Zaner | |
| 7,246,164 B2 | 7/2007 | Lehmann | |
| 7,269,590 B2 | 9/2007 | Hull | |
| 7,275,068 B2 | 9/2007 | Huberman et al. | |
| 7,343,335 B1 | 3/2008 | Olliphant | |
| 7,356,490 B1 | 4/2008 | Jacobi et al. | |
| 7,360,080 B2 | 4/2008 | Camnisch et al. | |
| 7,366,990 B2 | 4/2008 | Pitroda | |
| 7,383,258 B2 | 6/2008 | Harik | |
| 7,433,832 B1 | 10/2008 | Bezos et al. | |
| 7,433,876 B2 | 10/2008 | Spivack et al. | |
| 7,478,078 B2 | 1/2009 | Lunt | |
| 7,539,697 B1 | 5/2009 | Akella et al. | |
| 7,555,110 B2 | 6/2009 | Dolan et al. | |
| 7,610,287 B1 | 10/2009 | Dean et al. | |
| 7,742,468 B2 | 6/2010 | Vagelos | |
| 7,999,728 B2 | 8/2011 | Chen et al. | |
| 8,024,328 B2 * | 9/2011 | Dolin | G06F 16/9535 |
| | | | 707/E17.084 |
| 8,549,061 B2 | 10/2013 | Rao et al. | |
| 8,713,106 B2 | 4/2014 | Spataro et al. | |
| 9,094,390 B1 | 7/2015 | Rao et al. | |
| 2001/0011247 A1 | 8/2001 | O'Flaherty | |
| 2001/0039500 A1 | 11/2001 | Johnson | |
| 2002/0023230 A1 | 2/2002 | Bolnick | |
| 2002/0059130 A1 | 5/2002 | Chenq et al. | |
| 2002/0059201 A1 | 5/2002 | Work | |
| 2002/0091770 A1 | 7/2002 | Takakura et al. | |
| 2002/0103682 A1 | 8/2002 | Stemmer | |
| 2002/0116458 A1 | 8/2002 | Bricklin | |
| 2002/0116466 A1 | 8/2002 | Trevithick et al. | |
| 2002/0124053 A1 | 9/2002 | Adams et al. | |
| 2002/0137490 A1 | 9/2002 | Gallant | |
| 2002/0143874 A1 | 10/2002 | Marquette et al. | |
| 2002/0143944 A1 | 10/2002 | Traversal | |
| 2002/0169835 A1 | 11/2002 | Paul | |
| 2002/0174073 A1 | 11/2002 | Nordman et al. | |
| 2003/0014483 A1 | 1/2003 | Stevenson et al. | |
| 2003/0020977 A1 | 1/2003 | Smith et al. | |
| 2003/0050977 A1 | 3/2003 | Puthenkulam et al. | |
| 2003/0083898 A1 | 5/2003 | Wick | |
| 2003/0101227 A1 | 5/2003 | Fink | |
| 2003/0154213 A1 | 8/2003 | Ahn | |
| 2003/0163530 A1 | 8/2003 | Ribak | |
| 2003/0217151 A1 | 11/2003 | Roese et al. | |
| 2003/0233650 A1 | 12/2003 | Zaner | |
| 2004/0042599 A1 | 3/2004 | Zaner et al. | |
| 2004/0088275 A1 | 5/2004 | Elder et al. | |
| 2004/0088325 A1 | 5/2004 | Elder et al. | |
| 2004/0093224 A1 | 5/2004 | Vanska | |
| 2004/0122681 A1 | 6/2004 | Ruvolo et al. | |
| 2004/0122803 A1 | 6/2004 | Dom et al. | |
| 2004/0148275 A1 | 7/2004 | Achlioptas | |
| 2004/0162830 A1 | 8/2004 | Shirwadkar et al. | |
| 2004/0167794 A1 | 8/2004 | Shostack | |
| 2004/0172378 A1 | 9/2004 | Shanahan et al. | |
| 2004/0193684 A1 | 9/2004 | Yoseph | |
| 2004/0215793 A1 | 10/2004 | Ryan et al. | |
| 2004/0221309 A1 | 11/2004 | Zaner | |
| 2004/0233650 A1 | 11/2004 | Zaner | |
| 2004/0249811 A1 | 12/2004 | Shostack et al. | |
| 2004/0258220 A1 | 12/2004 | Levine et al. | |
| 2004/0260781 A1 | 12/2004 | Shostack et al. | |
| 2005/0015432 A1 | 1/2005 | Cohen | |
| 2005/0015457 A1 | 1/2005 | Warasawa | |
| 2005/0021750 A1 * | 1/2005 | Abrams | G06Q 50/01 |
| | | | 709/225 |
| 2005/0050158 A1 | 3/2005 | Solari | |
| 2005/0071741 A1 | 3/2005 | Acharya et al. | |
| 2005/0120084 A1 | 6/2005 | Hu et al. | |
| 2005/0152521 A1 | 7/2005 | Liljestrand | |
| 2005/0159998 A1 | 7/2005 | Buyukkokten et al. | |
| 2005/0165785 A1 | 7/2005 | Malkin et al. | |
| 2005/0171832 A1 | 8/2005 | Hull et al. | |
| 2005/0171954 A1 | 8/2005 | Hull et al. | |
| 2005/0177599 A1 | 8/2005 | Goodman | |
| 2005/0193054 A1 | 9/2005 | Wilson et al. | |
| 2005/0197846 A1 | 9/2005 | Pezaris et al. | |
| 2005/0198031 A1 | 9/2005 | Pezaris et al. | |
| 2005/0209999 A1 | 9/2005 | Jou | |
| 2005/0210409 A1 | 9/2005 | Jou | |
| 2005/0216300 A1 | 9/2005 | Appelman et al. | |
| 2005/0246420 A1 | 11/2005 | Little | |
| 2005/0256866 A1 | 11/2005 | Lu et al. | |
| 2005/0267766 A1 | 12/2005 | Galbreath et al. | |
| 2005/0289470 A1 | 12/2005 | Pabla et al. | |
| 2006/0026288 A1 | 2/2006 | Acharya et al. | |
| 2006/0077957 A1 | 4/2006 | Reddy et al. | |
| 2006/0085259 A1 | 4/2006 | Nicholas | |
| 2006/0136419 A1 | 6/2006 | Brydon et al. | |
| 2006/0184997 A1 | 8/2006 | La Rolanda et al. | |
| 2006/0206604 A1 | 9/2006 | O'Neil et al. | |
| 2006/0230061 A1 | 10/2006 | Sample et al. | |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0004941 A1 | 1/2008 | Calabria | |
| 2008/0056475 A1 | 3/2008 | Brannick et al. | |
| 2008/0133716 A1 | 6/2008 | Rao et al. | |

(56) References Cited

U.S. PATENT DOCUMENTS

| | | |
|---|---|---|
| 2008/0192656 A1 | 8/2008 | Vagelos |
| 2009/0013386 A1 | 1/2009 | Puthenkulam et al. |
| 2010/0198820 A1 | 8/2010 | Work |
| 2010/0241579 A1 | 9/2010 | Bassett et al. |
| 2011/0098156 A1 | 4/2011 | Ng et al. |
| 2011/0161279 A1 | 6/2011 | Rao et al. |
| 2011/0191417 A1 | 8/2011 | Rathod |
| 2011/0289011 A1 | 11/2011 | Hull et al. |
| 2011/0289153 A1 | 11/2011 | Hull et al. |
| 2011/0289574 A1 | 11/2011 | Hull et al. |
| 2015/0127565 A1 | 5/2015 | Chevalier et al. |
| 2015/0271222 A1 | 9/2015 | Rao et al. |

FOREIGN PATENT DOCUMENTS

| | | |
|---|---|---|
| JP | 2002132604 | 5/2002 |
| WO | WO 00/68860 A2 | 11/2000 |
| WO | WO 2001/084266 | 11/2001 |
| WO | WO 02/79984 | 10/2002 |
| WO | WO 00/68860 A3 | 7/2003 |
| WO | WO 05/015470 A1 | 2/2005 |

OTHER PUBLICATIONS

Accounts, Website, web page at https://www.cs.rice.edu/~ssiyer/accounts/, as available via the Internet and printed Jul. 29, 2004, 1 page.

Adamic et al., "A Social Network Caught in the Web," First Monday, Jun. 2, 2003, vol. 8, No. 6, pp. 1-22.

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

AMAZON.COM, "Amazon.com Friends and Favorites," retrieved from http://www.amazon.com/exec/obidos/subsl/ ::ommunity/community-home.html/ref=pd_ys_ . . . , Feb. 27, 2004, 6 pgs.

AMAZON.COM, "Feedback FAQ," retrieved from http://pages.amazon.com/execlobidos/tg/browse/-/1161284/qid=1 7 J91110289/sr=1-1/002-2, Jul. 29, 2004, 3 pgs.

AMAZON.COM, "How to Get a Great Feedback Score," retrieved from http://pages.amazon.com/execlobidos/tg/browse/-/131074 71/qid=1091110289/sr=1-5/002, Jul. 29, 2004, 3 pgs.

AMAZON.COM, "New Seller FAQ," retrieved from http://pages.amazon.com/execlobidos/lg/browse/-/1161274/002-2835726-5513622, Jul. 29, 2004, 3 pgs.

AMAZON.COM, "Selling at Amazon Marketplace," retrieved from http://pages.amazon.com/execlobidos/lg/browse/-/1161234/ref-hp_hp_ls_4_2/002-283572, Jul. 29, 2004, 2 pgs.

AMAZON.COM, "Wish Lists," retrieved from http://www.amazon.com/exec/obidos/lg/browse/-/897204/ ef=ya_hp_reg_1/002-9880811-. . . , Feb. 18, 2004, 4 pgs.

AMAZON.COM, "Purchase Circles," retrieved from http://www.amazon.com/exec/obidos/lg/browse/468604/ ef=cm_pc_faq/002-0759267-82. . . , Feb. 27, 2004, 2 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Avery et al., "Recommender Systems for Evaluating Computer Messages," Communications of the ACM, Mar. 1997, vol. 40, No. 3, pp. 88-89.

Baird et al., "Neomillennial User Experience Design Strategies: Utilizing Social Networking Media to Support 'Always On' Learning Styles," J_ Educational Technology Systems, vol. 34(1 ), 2005-2006, Baywood Publishing Co., Inc., pp. 5-32.

Balabanovic, M., et al., "Content-Based, Collaborative Recommendation," Mar. 1997, pp. 66-72, vol. 40, No. 3.

Boyd et al., "Social Network Sites: Definition, History, and Scholarship," Journal of Computer-Mediated Communication, International Communication Association, 2008, pp. 210-230.

Choi, "Nelflix Prize for the best collaborative filtering algorithm," Data mining and parallelization, CGL Blog, retrieved rom http://jychoi-report-cgl.blogspol.com/2008/07/nelflix-prize-for-best-collaborative.html, Jul. 16, 2008, 3 pgs.

Churchill et al., "Social Networks and Social Networking," IEEE Internet Computing, Sep.-Oct. 2005, pp. 14-19.

Cohen et al., "Social Networks for Creative Collaboration," C&C '05, Apr. 12-15, 2005, London, United Kingdom, pp. 252-255.

Collaborative filtering, Wikipedia, Last modified Oct. 17, 2007, [online] [Retrieved on May 13, 2009] Retrieved from the internet <URL: http:// web .archive. org/web/20071020061658/hllp:/en. wikipedia .org/wiki/Collaborative_filtering>.

Decker, S., et al., "The Social Semantic Desktop", DERI Technical Report May 2, 2004, May 2004, 7 pages.

Doctoros, "Running Notes From Revenge of the User: Lessons from Creator/User Battles," web page at https://craphound.com/danahetcon04.txt, as available via the internet and printed Jul. 28, 2004.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle, N., et al., "Social Serendipity: Proximity Sensing and Cueing", MIT Media Laboratory Technical Note 580, May 2004, 18 pages.

Ebay.com, "Frequently Asked Questions," 4 pages, [online] [Retrieved on Jul. 29, 2004] Retrieved from the internet <URL:http://pages.ebay.com/help/basics/faq.html as available via the internet and printed on Jul. 29, 2004>.

Ebay.com, "How to Bid," 2 pages, [online] [Retrieved on Jul. 29, 2004] Retrieved from the internet <URL: http://paqes .ebav. com/help/welcome/bid. html>.

Ebay.com, "How to Sell, " 2 pages, [online] [Retrieved on Jul. 29, 2004] Retrieved from the internet <URL: http://pages .ebay. com/help/welcome/sell. html.

Ebay.com, "Star," 2 pages, [online] [Retrieved on Jul. 1, 2008] Retrieved from the internet <URL:http://paaes.ebav.com/help/basics/a-stars.html>.

Ebay.com, "What is eBay?" 2 pages, [online] [Retrieved on Jul. 29, 2004] Retrieved from the internet <URL:http://pages.ebav.com/help/welcome/questions/about-ebav.html>.

Erickson, T., et al., "Social Translucence: Using Minimalist Visualizations of Social Activity to Support Collective Interaction", In Designing Information Spaces: The Social Navigation Approach (eds. K. Hook, D. Benyon, A Munroe), Springer-Verlag: London, 2003, pp. 17-41.

European Examination Report for European Patent Application EP 05722454.5, Feb. 8, 2007, 5 Pages.

Felicite.com, Wedding Registry & Gift Registry, Internet Archive Wayback Machine archived on May 30, 2003 , 17 Pages, [online] [Retrieved on Feb. 2, 2007] Retrieved from the internet <URL: http:!/web. archive .ora/web/20030530051929 I http://www. fel icite.com>.

Glance, N., et al., "Knowledge Pump: Supporting the Flow and Use of Knowledge," Information Technology for Knowledge Management, 1998, 22 pgs.

Google, Inc., "Google Answers," Google, 2004, 1 page, [online] [retrieved on Jul. 29, 2004] retrieved from the internet <URL:http://answers.qooqle.com/answers/>.

Google, Inc., "Google Answers: Frequently Asked Questions," Google, 2003, 9 pages, [online] retrieved on Jul. 29, 20041 retrieved from the internet <URL:http://answers.aooale.com/answers/faa.html>.

Gross, R., et al., "Information Revelation and Privacy in Online Social Networks", WPES'05, Nov. 7, 2005, ACM, pp. 71-80.

Hammond, T., et al., "Social Bookmarking Tools (I)", D-Lib Magazine, Apr. 2005, 23 pages, vol. 11, No. 4.

(56) References Cited

OTHER PUBLICATIONS

Harper, "Is Friendster the Next Big Thing'?" retrived from http://mobilemomentum.msn.comlarticle.aspx?aid=4 on Uul. 29, 2004, 2 pgs.

Heer, J., et al., "Vizster: Visualizing Online Social Networks", IEEE Symposium on Information Visualization, 2005, 8 pages.

International Search Report and Written Opinion, International Application No. PCT/US2005/001544, Apr. 29, 2005, 9 pgs.

International Search Report and Written Opinion, International Application No. PCT/US2005/002240, Sep. 26, 2006, 5 pgs.

International Search Report, International Application No. PCT/US2008/005118, Sep. 30, 2008, 2 pgs.

Iyer, S., "Accounts Website," 7 Pages, [online] [Retrieved on Jul. 29, 2004] Retrieved from the internet <URL:http://www.cs.rice.edu/-ssiyer/accounts/>.

Jensen, C., et al., "Finding Others Online: Reputation Systems for Social Online Spaces," Group Spaces, CHI 2002, Apr. 20-25, 2002, pp. 447-454, vol. 4, lss. 1.

Kamvar, S., et al., "The EigenTrust Algorithm for Reputation Management in P2P Networks." International World Wide Web Conference Proceedings of the 12th Proceedings of the 12th ICWWW 2003, pp. 640-651.

Kautz, H., et al., "ReferralWeb: Combining Social Networks and Collaborative Filtering," Communications of the ACM, Mar. 1997, 4 pgs, vol. 40, No. 3.

Kirkpatrick, "Twitter Announces Fire Hose Marketplace: Up to 1 Ok Keyword Filters for 30 Cents!" Apr. 4, 2011, 49 etrieved from http://www.readywriteweb_com/archives/twitter_ announces fire_hose_marketplace_up_to_ 1 0k_php, 7 pgs.

Konstan, J., et al., "Applying Collaborative Filinger to Usenet News," Communications of the ACM, Mar. 1997, pp. 77-87, vol. 40, No. 3.

Leonard, "You Are Who You Know," retrieved from http://www.salon.com on Jun. 15, 2004, 15 pgs.

Livejournal, "FAQ #163: How Do I Find a Syndicated Account?" Last Updated: thebubba, Jan. 6, 2004, 2 pgs.

Lockheed-Martin Corporation "Battlefield awareness and data dissemination intelligent information dissemination server," AFRL-IF-RS-TR-1999-238, Final Technical Report, Nov. 1999, 31 pages.

Lueg, "Considering Collaborative Filtering as Groupware: Experiences and Lessons Learned," Proceedings of the Second International Conference of Practical Aspects of Knowledge Management, 1998, pp. 16-1-16-6.

Marwick, "Selling Your Self: Online Identity in the Age of a Commodified Internet," University of Washington, 2005, 192 pgs.

Medias I Ft Ltd., "DataSifl: Realtime Social Data Mining Platform: Curate and Data Mine the Real Time Web with DataSifl, " retrieved from http://datasifl.net on May 13, 2011, 1 pg.

Menger et al., "Technology for Communities," CEFRIO Book Chapter v 5.2, Jan. 18, 2005, pp. 1-15.

Menna, "Phone Valet: Integrate your Phone with Mac OS X, O'Grady's PowerPage," http://www.powerpage.org/cgi-bin/WebObjects/powerpage.woa/wa/story?newsID-11803, Feb. 17, 2004 [Retrieved on Jul. 28, 2004].

Metcalf et al., "Spatial Dynamics of Social Network Evolution," 23rd International Conference of the System Dynamics Society, Jul. 19, 2005, pp. 1-13.

Microsoft Corporation, "Is Friendster the Next Big Thing?" web page at http://mobilemomentum.msn.com/article.aspx?aid=4, as available via the internet and printed Jul. 29, 2004, 1 page.

Mori et al., "Real-world Oriented Information Sharing Using Social Networks," Group '05, Sanibel Island, Florida, USA, Nov. 6-9, 2005, pp. 81-84.

Multiply, "About Multiply," retrieved from http://multiply.com/info/about on May 3, 2004, 2 pgs.

Multiply, "Help," retrieved from http://multiply.com/info/help on May 3, 2004, 2 pgs.

Multiply, "Multiply Privacy Policy," retrieved from http://multiply.com/info/privacy on on May 3, 2004, 4 pgs.

Multiply, "Multiply Terms of Service," retrieved from http://multiply.com/info/los on on May 3, 2004, 6 pgs.

Nardi et al., "Blogging as Social Activity, or, Would You Let 900 Million People Read Your Diary?" CSCW'04, Nov. 5-10, 2004, vol. 6, No. 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Nomadnet, "NomadNet News," retrieved from http://www.netnomad.com/ on Dec. 1, 2004., 12 pgs.

Ofoto, "Ofolo Share Albums," retrieved from http://www.ofoto.com/ShareOverview.isg?UV=36308566308678428514107 on Dec. 1, 2004, 2 pgs.

O'Murchu et al., "Online Social and Business Networking Communities," Digital Enterprise Research Institute DERI Technical Report, National University of Ireland, Aug. 11, 2004, 22 pgs.

Online Business Network, "Social Networking Site Guide-Ryze," retrieved from http://www.Jnlinebusinessnetworks.com/online-social-networks-guide/ryzEIQbp on Dec. 1, 2004, 8 pgs.

PC World, "PCWorld-ICQ Builds a Social Network," web page at http://www.pcworld.com/news/article/0.aid.115084.00.asp, as available via the internet and printed Dec. 1, 2004, 1 page.

PCT International Search Report and Written Opinion, PCT/US2005/001544, Apr. 29, 2005, 9 Pages.

PCT International Search Report and Written Opinion, PCT/US2005/002240, Sep. 26, 2006, 5 Pages.

Petersen's Photographic, "My Photos at Photographic," retrieved from http://myphotos.photographic.com/ on Dec. 1, 2004, 19 pgs.

Picturedot, "Cactus Vision WebCam from PictureDol.com-Broadcast your live webcam now, Free!" retrieved from http://www.picturedol.com/CactusVision WebCam Info.asp on Dec. 1, 2004, 2 pgs.

Planetall, www.planelall.com, Nov. 1997, retrieved from Internet Archive Wayback Machine: URL:www.archive.org/www.planelall.com, 19 pgs.

Pruitt, "ICQ Builds a Social Network: New service uses IM, allowing members to meet and greet in real time," retrieved from http://www.pcworld.com/news/article/O,aid, 115084,OO.asg on Dec. 1, 2004, 5 pgs.

Recommender system, Wikipedia, Last modified Jul. 27, 2009, [online] [Retrieved on Aug. 6, 2009] Retrieved from the internet <URL:http://en.wikipedia.org/wiki/Recommendalion_system>.

Resnick, P., et al., "Recommender Systems," Communications of the ACM, Mar. 1997, vol. 40, No. 3, pp. 56-58.

Ring Central, Inc., "Phone and Fax Service as Unique as Your Business," retrieved from http://www.ringcentral.com on Apr. 19, 2007, 1 pg.

Rucker et al., "Personalized Navigation for the Web," Communications of the ACM, Mar. 1997, vol. 40, No. 3, pp. 73-75.

SAE International, "Why should I Login to use the SAE website?" retrieved from http://my.sae.org/whyregister. him on Dec. 1, 2004, 1 pg.

Schulzrinne et al., "The Session Initiation Protocol: Providing Advanced Telephony Services Across the Internet," Bell Labs Technical Journal., Ocl.-Dec. 1998, pp. 144-160.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue, "Freeband FRUX, Oct. 17, 2005, Internet Journal, Netherlands, pp. 1-4.

Sullivan, "Is ii Really Personalized Search?" http://searchenginewatch.com, printed May 13, 2004, 5 pgs.

Superfeedr, "Track," Jul. 1, 2010, retrieved from http://blog.superfeedr.com/lrack/filter/xmpp/pubsubhubbub/lrack Jn May 13, 2011, 8 pgs.

Target.com, "Target.com Wish Lisi," retrieved from http://www.largel.com/gp/registry.html?ref=nav_t_gc/601- 19177590687329?%5Fencoding=UTF8&lype=wishlist on Aug. 4, 2004, 2 pgs.

Theme Your Desktop, "Free Webcam Thumbnails on your Desktop—Any webcam.com," retrieved from http://themes.anywebcam.com/desktop/desktop.hlml on Dec. 1, 2004, 3 pgs.

(56) References Cited

OTHER PUBLICATIONS

Tribenet, "Listings Directory," retrieved from http://www.tribe.nelllribe/servlelllemplale/pub.Lislings.vm on Jun. 28,J004, 2 pgs.

Twincities.com, "Registration-Member Benefits," retrieved from http://registration.twincities.com/reg/rnamberBenefils.do on Dec. 1, 2004, 1 pg.

Twitter Announces Fire Hose Marketplace: Up To 10K Keyword Filters For 30 Cents, Internet, retrieved at http://www.readywriteweb.com/archives/lwitter_announces_fire_hose_markelplace_up_to_ 10k.php, May 13, 2011, 7 pgs.

Twitter Blog: Tracking Twigger, Internet, retrieved at hllp://blog.twitter.com/2007/09/lracking-twitter.html, May 13, 2011, 2 pgs.

TWITTER.COM, "Twitter Blog: Tracking Twitter," Sep. 24, 2007, retrieved from http://blog.twitter.com/2007/09/tracking-twitter.html, 2 pgs.

Van Eijk et al., "We-centric, context-aware, adaptive mobile service bundles," Freeband, Telematica Instituut, TNO telecom, Nov. 30, 2004, 48 pgs.

Webcam Central, "MyCams Listing," retrieved from http://www.camcentral.com/mycams.asp on Dec. 1, 2004, 2 pgs.

Westlaw, "WestClip", 2004, retrieved from http://west.thomson.com/westlawtwestclip, on Jul. 28, 2004, 3 pgs.

Yahoo! Inc., "My Yahoo! Introducing RSS Headlines," retrieved from http://e.my.yahoo.com/config/promo_content ?.rnodule=content on Jun. 18, 2004, 1 pg.

Yahoo! Inc., "Welcome to My Yahoo!" retrieved form http://my.yahoo.com/ on Mar. 22, 2004, 10 pgs.

Yahoo! Inc., "Yahoo Groups: Customize LostDrive-ln," retrieved from http://groups.yahoo.com/group/losldrivein/conwiz on Jun. 2, 2004, 10 pgs.

Yahoo! Inc., "Yahoo! Chat," retrieved from http://chat.yahoo.com/ on Dec. 1, 2004, 1 pg.

Yahoo! Inc., "Yahoo! GeoCities: Yahoo! GeoCities Tour," retrieved from http://help.yahoo.com/help/US/geollourllour-01.html on Dec. 1, 2004, 20 pgs.

Yahoo! Inc., "Yahoo! Groups," Yahoo! Inc., 2004, 2 pages, [online] [retrieved on Jul. 29, 2004] retrieved from the internet <URL:http://groups.vahoo.com>.

Yahoo! Inc., "Yahoo! Groups: Groups Database Help," retrieved from http://help.yahoo.com/help/us/groups/dlatabase, on Jul. 29, 2004, 9 pgs.

Yahoo! Inc., "Yahoo! Groups: Groups Help, " retrieved from http://help.yahoo.com/help/us/groups/groups-01.html on Jul. 29, 2004, 12 pgs.

Yahoo! Inc., "Yahoo! Groups: What is a Group," retrieved from http://groups.yahoo.com, on Jul. 29, 2004, 2 pgs.

Yahoo!, "Yahoo! Help-Yahoo! GeoCities Tour," web page at http://help.yahpp.com/help/us/geo/tour/tour-01.html, as available via the internet and printed Dec. 1, 2004.

* cited by examiner

METHODS AND SYSTEMS FOR PROVIDING A DOCUMENT

RELATED APPLICATIONS

This application is a continuation of U.S. application Ser. No. 16/290,677, filed Mar. 1, 2019, which is a continuation of U.S. application Ser. No. 14/248,230, now U.S. Pat. No. 10,223,470, filed Apr. 8, 2014, which is a continuation of and claims priority to U.S. application Ser. No. 13/193,572, now U.S. Pat. No. 8,719,177, filed Jul. 28, 2011, titled "Methods and Systems for Providing a Document," which is a division of U.S. application Ser. No. 10/911,075, now U.S. Pat. No. 8,015,019, filed Aug. 3, 2004, titled "Methods and Systems for Providing a Document." The disclosure of each of the foregoing applications is incorporated herein by reference.

FIELD OF THE INVENTION

The invention generally relates to providing documents. More particularly, the invention relates to methods and systems for providing a document with a portion that is dynamically updated.

BACKGROUND

People create personal web pages, and may like to provide up-to-date information on their personal web pages. Some known websites, such as those hosted on Friendster™, Tribe™, and Tickle™ facilitate interaction between members of a network or group. These conventional member-network systems generally do not provide members with effective mechanisms to provide and manage dynamically updated content.

SUMMARY

Embodiments of the present invention comprise systems and methods for providing a document. One embodiment of the present invention comprises hosting a document for a first member of a social network. The document may comprise a portion selected by the first member that is dynamically updated with content. This embodiment further comprises identifying an audience criterion for the portion, and a type of relationship between the first member and a second member of the social network. If the type of relationship between the first member and the second member satisfies the audience criterion, the second member may be provided with access to at least the portion.

This embodiment is mentioned not to limit or define the invention, but to provide an illustrative embodiment of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Overview

Embodiments of the present invention provide systems and methods for providing a document. A variety of systems and methods may be implemented according to the present invention, and they may operate in a variety of environments. By way of introduction and example, the subject matter of the invention in one embodiment may relate to providing a social network member an opportunity to generate a personalized portal page including dynamically updated content of interest or relevance to the member, such as weather forecasts, sports scores, financial market numbers, movie show times, etc. This portal page may be accessible from the member's social network member profile and/or may be accessible to some or all of the other members of the social network. This introduction is given to introduce the reader to the general subject matter of the invention. By no means is the invention limited to such subject matter. Illustrative embodiments are described below.

System Architecture

Figure 1:
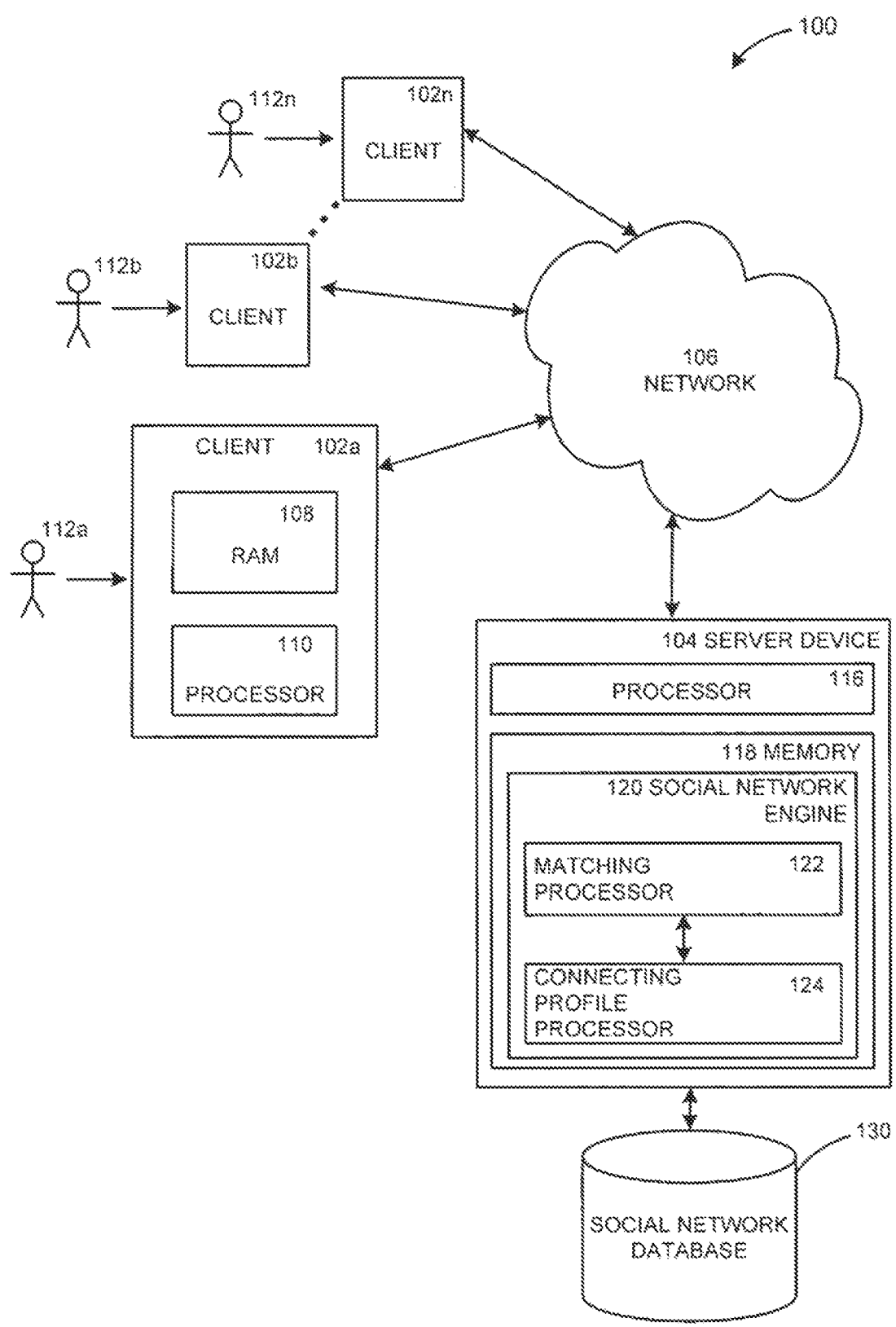
FIG. 1 is a diagram of a system according to one embodiment of the present invention.

Referring now to the drawings in which like numerals indicate like elements throughout the several figures, FIG. 1 is a diagram of a system according to one embodiment of the present invention. The system 100 shown in FIG. 1 comprises multiple client devices 102*a-n* in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102*a-n* shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of suitable processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. SenTer device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, California and Motorola Corporation of Schaumburg, Illinois.

Memory 118 contains a social network engine application program, also known as a social network engine 120. The social network engine 120 facilitates members, such as user 112a, interacting with and participating in a social network. A social network can comprise profiles that can be associated with other profiles. Each profile may represent a member and a member can be, for example, a person, an organization, a business, a corporation, a community, a fictitious person, or other entity. Each profile can comprise entries, and each entry can comprise information associated with a profile. Examples of entries for a person profile can comprise information regarding relationship status, birth date, age, children, ethnicity, religion, political view, sense of humor, sexual orientation, fashion preferences, smoking habits, drinking habits, pets, hometown location, passions, sports, activities, favorite books and music, TV or movie preferences, favorite cuisines, email addresses, location information, IM name, phone number, address, skills, career, or any other information describing, identifying, or otherwise associated with a profile. Entries for a business profile can comprise market sector, customer base, location, supplier information, net profits, net worth, number of employees, stock performance, or other types of information associated with the business profile. Additionally, entries associated with a profile can comprise associations with other profiles. Associations between profiles within a social network can include, for example, friendships, business relationships, acquaintances, community associations, activity partner associations, common interest associations, common characteristic associations, or any other suitable type of association between profiles.

The social network engine 120 can comprise a rating processor 122. The rating processor 122 can facilitate the ability of the user 112a to rate other members and can determine overall ratings for each member. The rating processor can cause the display on the client device 102a of a ratings interface. The ratings interface can display member names associated with the user 112a and allow the user 112a to rate each associated member. A member's overall rating can be contained in and displayed with the member's profile. The member's overall rating can in part determine the appearance of a member's icon.

Server device 104 also provides access to storage elements, such as a social network storage element, in the example shown in FIG. 1, a social network database 130. The social network database 130 can be used to store member profiles. Data storage elements may include anyone or combination of methods for storing data, including without limitation, arrays, hash tables, lists, and pairs. The server device 104 can access other similar types of data storage devices. The social network engine 120 can receive data comprising the members' profiles from the social network database 130 and can also send data comprising member profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely illustrative, and is used to help explain the social networks and methods illustrated in FIGS. 2-5.

Exemplary Social Network

Figure 2:
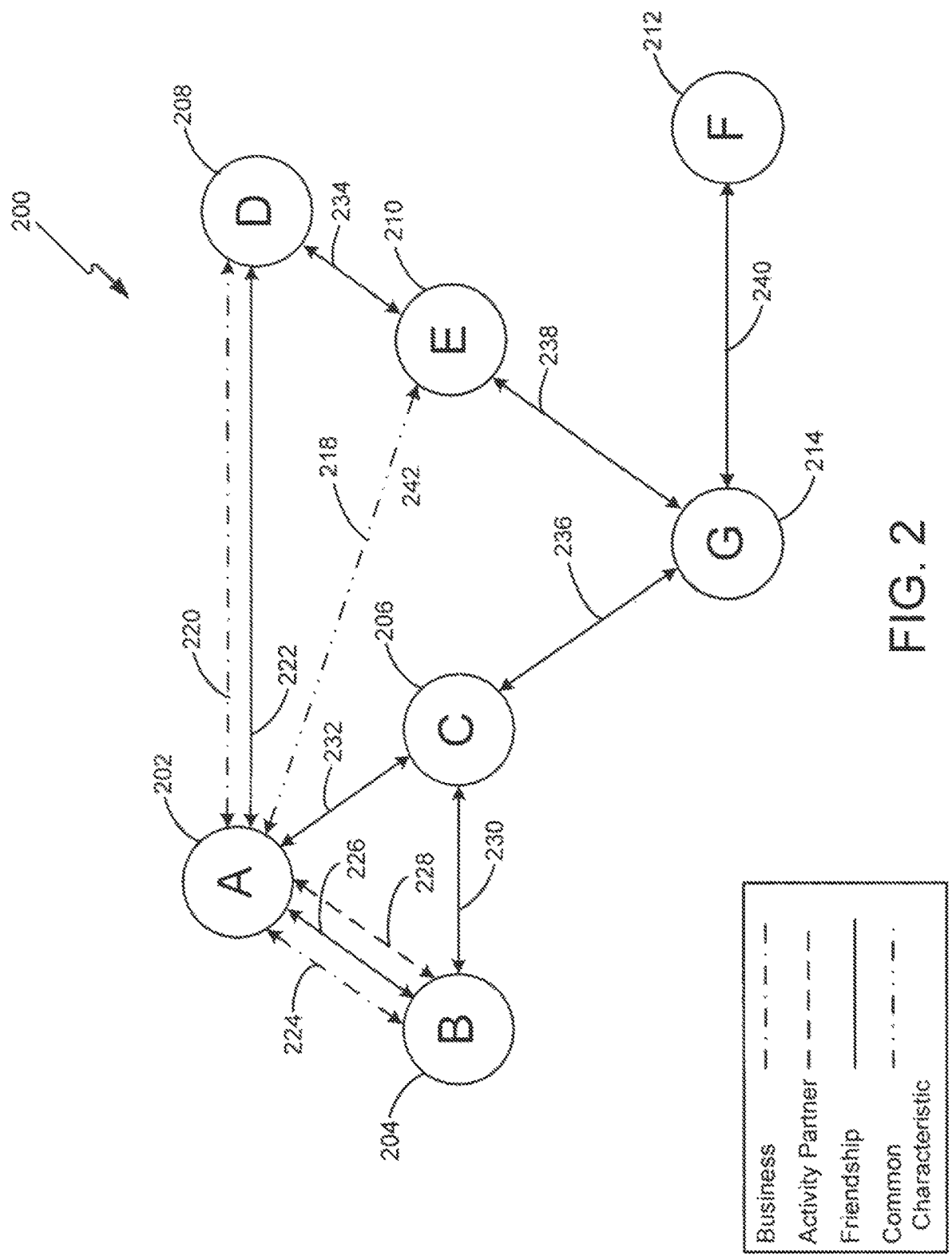
FIG. 2 shows a diagram of a social network according to one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, and 234. The vertices 202, 204, 206, 208, 210, 212, and 214 comprise profiles A, B, C, D, E, F, and G, respectively. Each profile can represent a member profile of a member of the social network 200. The exemplary network 200 shown in FIG. 2 has seven members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills, educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

In FIG. 2, the edges 218, 220, 222, 224, 226, 228, 230, 232, and 234 shown comprise associations between profiles. According to the embodiment shown in FIG. 2, the social network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, F, and G comprising the vertices 202, 204, 206, 208, 210, 212, and 214, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends would include profile B, but a display of profile B's friends would not include profile A.

Within a social network, a degree of separation can be determined for associated profiles. In one embodiment, a degree of separation between two profiles can be determined the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each associations and a corresponding weighting factor prior to summing the associations. Thus, highly weighted associations would contribute less to the resulting sum than lower weighted associations.

Illustrative Methods

Various methods may be implemented in the environment shown in FIG. 1 and other environments, according to the present invention. Methods according to the present invention may be implemented by, for example, a processor-executable program code stored on a computer-readable medium.

For example, in one illustrative embodiment of a method according to the present invention, a document may be hosted for a first member of a social network. An example of social network is the Orkut™ social network. A document may comprise data reflecting information relevant to a topic or topics, including information allowing one to find other relevant information. An example of a document comprises a web page, such as a web page having links or other means to locate or view relevant information (also known as a portal page). Other suitable types of documents may be hosted. Hosting the document may comprise storing the document on a server, or otherwise providing computer or communication facilities to facilitate access to the document. The host may be a provider or facilitator of the social network, or may be another entity (such as a person or a company).

The hosted document may comprise a portion that is dynamically updated with content. Such a portion may comprise all or part of the document, whether seen or unseen when viewing a display of the document. A portion of a document may comprise, for example, a particular part of a web page, a particular area of a web page, a graphic element of a web page, or other portion, or computer code (such as HTML) embodying such examples. The portion may be selected by the first member, mentioned above, by another member, or by another entity. The member may select the portion in any suitable manner. Examples of such selecting include selecting the portion for inclusion in the document from a menu in a graphical user interface, and indicating selection of the portion or a category including the portion using such an interface.

A portion that is dynamically updated may comprise a portion that is changed periodically (whether on a regular or irregular frequency). The content of a dynamically updated portion may change as needed or desired, and may change slightly or significantly. A document may comprise one or more portions. A portion may comprise, for example, a regularly updated source for various types of information. A portion may be updated with new content and information available on an information network, such as the Internet. In one embodiment, a portion may be updated in association with availability of current information. For example, a portion that provides information about real estate may be updated when a new listing matching the stated criteria of a user is posted on the Internet. Another embodiment may provide a user with up-to-the-minute airline fare information for routes the user regularly flies or wishes to fly.

In one embodiment, the dynamically updated portion may be dynamically updated with third-party content, e.g., content provided or sent by an entity independent of an entity hosting the document for the member and independent of the member. Examples of a content that may be dynamically provided and updated in a portion may comprise information such as weather, news, sports, movie listing and review, entertainment, financial market and portfolio, calendar and scheduling, health care, television listing, radio listing, navigational, children-oriented, horoscope and astrological, employment, personal and classified advertisement, Internet and phone directory, astronomical, fantasy sports league, online gaming, reference, real estate, travel, retail, search engine, social network group, social network friend, auction, automotive, periodical, newspaper, chat group, instant messaging, and electronic mail information.

Some social network members may wish to share a document that they have customized. Similarly, social network members may wish to view the documents that other members, friends, and contacts on the social network have created or modified. A user may wish to set an audience criterion to allow only those other members that he or she wishes to allow access to a document. In one embodiment, only certain portions of a document may be subject to an audience criterion. For example, a user may wish to allow all members of a social network access to all but a single portion on his or her document. In such a circumstance, only the portion that the user wishes to exclude from a general pool of social network members may be subject to an audience criterion.

An audience criterion for the portion may be identified by a processor or otherwise. The audience criterion may be any suitable criterion related to an audience or potential audience for the portion and/or the entire document, and the identification may be accomplished in any suitable manner. For example, identifying the audience criterion for the portion may comprise receiving a relationship criterion from the social network member for which the document is hosted. Examples of relationship criterion include friend, co-worker, family member, business associate, common-interest association, common-geography association, member category association, and intermediary relationship. This criteria may be input by the social network member using a graphical user interface associated with the social network, may be inferred or derived from the member's actions, profile, or other information, or may be identified in another manner. The criteria may also, or alternatively, comprise a relationship weight, such as a level of relationship designated by the social network member.

Access to the document portion may be provided to another member of the social network if the other member meets certain criteria. The host may, for example, receive a request for access to the document from a second member of the social network. The host may identify a type of relationship between the first member (the member for which the document is hosted) and a second member of the social network. In one embodiment, the first and second members may have agreed on the type of relationship (such as through a process whereby the first member offers a type of relationship, and the second member accepts). The host or other entity managing access to the portion may access profile data (such as entries or other suitable information in a social network member's profile) associated with the first member, the second member, or both, and may identify the type of relationship (or the level of relationship or other aspect of the relationship) based, at least in part, on the profile data.

If the type of relationship (or the level of relationship or other aspect of the relationship) between the first member and the second member, as so identified, satisfies the audience criterion, the second member may be provided with access to at least the portion by the host. Such access may include receiving the portion from the host when the host provides the portion, simply having the portion accessible for a time period if desired, or otherwise allowing for access.

In another illustrative embodiment, one or more portions of documents associated with members of a social network may be used to generate a new document (such as a web page) for a member of a social network. In one example, members of a social network may have previously selected dynamically updated portions (or dynamically-updated content for those portions) for documents, such as web pages, with which they are associated. The members carrying out such selections may comprise members besides the member for which a document is to be generated. A processor may determine whether such a portion may be of interest to a first member of the social network, and if so, the portion may be selected for inclusion in a generated document. The first member may be provided access to the generated document comprising the portion. In this manner, for example, a web page may be generated for a member of a social network that comprises dynamic content selected by other members of the social network (such as dynamic content that is popular among other members). The host may host the generated document for the first member by, for example, causing the document to be stored on a server accessible to members of the social network.

The determination of whether the portion may be of interest to a particular member of the social network may be made in any suitable manner. For example, a processor may access profile data associated with the member, and determine whether the portion may be of interest to the member based, at least in part, on the profile data. For example, a portion that provides regularly-updated personality-matching singles' dating information for people in the Seattle, Washington area may be of interest to a member with profile data entries in his or her member profile that relate that he or she is 27 years old, single, living in Seattle, and wishes to use the social network to find dates or activity partners. As another example, a member may submit to the processor a request to include a particular portion. In one such embodiment, the portion may be communicated to the member as of interest, and the member may be prompted by the processor (through a graphical user interface or otherwise) to indicate whether to include the portion in a generated document.

Identifying the portion of the document for inclusion may comprise identifying a type of relationship between the member for which the document is to be generated and the member of the social network with which the document containing a portion of possible interest is associated. If the type of relationship satisfies a relationship criterion, the portion may be selected from the document for inclusion in the generated document. The relationship criterion may be selected in any suitable manner, and some examples of relationship criterion are described above.

Access to the document generated in this manner may be open, or it may be limited. A document generated for the member that includes a portion that may be of interest to the member may be accessible only to the member, and inaccessible to other members of the social network. In one embodiment, the generated document may be password protected, and accessible only to those with knowledge of, or access to, the password, such as the member himself or herself. In another embodiment, the generated document may be accessible only to a plurality of members of the social network that meet an audience criterion. The audience criterion may be provided by the first member (the member for which the document was generated). As examples, the audience criterion may comprise a mutually agreed upon relationship, a relationship with a shared intermediary member of the social network, a specified degree of separation, a member category association, or other criterion.

Determining whether the portion may be of interest to a member of the social network may involve considering data associated with multiple members of the social network. In one embodiment, determining whether the portion may be of interest to a first member may comprise identifying a plurality of members of the social network with which the first member has a relationship, and determining a number of instances of the portion in a plurality of documents associated with the plurality of members. By determining the number of instances, the level of popularity of the portion may be determined. For example, if a large number, or a large percentage, of such members has the portion present on a web page they selected, it may be inferred that the first member may also be interested in having the portion of the first member's web page. Identifying the plurality of members having such a relationship with the first member may comprise accessing profile data associated with the plurality of members. The portion of interest may be chosen based, at least in part, on the profile data of this plurality of members.

Certain portions may comprise dynamically updated content that is time sensitive. For example, a portion that provides updated information about the Summer Olympics may only be particularly useful to a document user during the occurrence of the subject Olympic games, and for a brief period before and after their occurrence. Accordingly, in order to timely identify such a time-sensitive portion, it may be useful for a social network engine to look at the rate of addition or deletion of a particular portion to the plurality of documents. A high rate of addition or deletion may indicate that the particular portion may be of great or little interest, respectively. If the rate of addition of the time-sensitive portion to documents of social network members associated with the first member is high, then the social network engine may find it desirable to quickly alert the first member to the rapid rise in popularity of the particular portion. Conversely, if the rate of deletion of a portion is high, it may indicate that the particular portion is rapidly becoming out of date, unimportant, and/or unpopular.

The identification of a portion of possible interest to the first member may be based; at least in part, on a usage rate or a dormancy rate of the portion by a plurality of social network members. A usage rate may comprise a measure of how often social network members who have a particular portion on their respective documents use or access information from the display. A dormancy rate may comprise a measure of how many social network members have a particular portion on their personalized documents, but rarely or never access information provided by the display. For example, if a portion can be found on a number of social network members' documents, and is regularly used by a large number or percentage of these members, a social network engine may deem the portion to have a high usage rate. The portion may therefore be of interest to the first member. Conversely, if a portion is not often used by most of the social network members who have it on their documents, a dormancy rate associated with the particular portion may be high, and the portion may not be of interest to the first member.

Member categories may be used in such determinations as well. For example, a member category to which the first member belongs may be identified (such as "sports fan," "New York City resident," or other category). In one embodiment, whether or not the portion may be of interest to the first member may comprise determining whether the portion may be of interest to a plurality of members of the social network belonging to a member category to which the first member belongs. In one such embodiment, profile data associated with the plurality of members of the social network belonging to the member category may be accessed by a processor, and the processor may determine whether the portion may be of interest to the plurality of members based, at least in part, on the profile data. In another such embodiment, the processor may identify a request to include the portion from at least one of the plurality of members of the social network belonging to the member category, and determine whether the portion may be of interest to the plurality of members based, at least in part, on the request. Also, whether or not a portion may be of interest to a first member of the social network may be based, at least in part, on the number of instances of the portion in a plurality of documents associated with a plurality of members of the social network belonging to a same member category as the first member.

Another illustrative embodiment of a method according to the present invention comprises including member-selected portions in a document (such as a web page) for the member. In one such method, a processor may identify a portion of a document having dynamically-updated content that has been selected by at least one of a plurality of members of a social network. The processor may access profile data associated with a first member of the social network, and determine whether the portion may be of interest to the first member based, at least in part, on the profile data. The portion may then be communicated to the first member, and the first member may be prompted to indicate whether to include the portion in a generated document. For example, the portion may be displayed or described to the member using a graphical user interface, and the interface may include a prompt (such as a question or a selection menu). The processor may receive a request from the first member to include the portion, and the portion may then be selected for inclusion in a generated document based at least in part on this request. The processor may then cause the generated document to be hosted, whether on a server or otherwise, and to be provided to the first member and others, if desired.

Embodiments of the present invention may also be used to identify portions that may be of interest to a group of associated social network members, such as a social network member category or community One such embodiment comprises accessing profile data associated with the group, such as the individual group members' social network member profiles, and selecting a portion that may be of interest to the group based, at least in part, on the accessed profile data. For example, a portion that provides dynamically updated information about a political race and its candidates may be of interest to members of a group of social network members comprising a stated goal of fostering discussion about political topics and wherein a plurality of the members of the group have entries in their respective plurality of member profiles relating that they are involved with politics and are working on the respective campaigns of the candidates for the political race.

A document generated for a group of members, such as a social network community, may comprise a portion identified to be of possible interest to the members of the group, or a portion thereof. For example, in one embodiment, at least one member of the group may be provided such a generated document in response to identification of a request from at least one other member of the group to include the identified portion in the generated document. In another such embodiment, in order for a portion that may be of interest to the group to be provided with a generated document, requests to include the identified portion must be identified from at least a predetermined number of members of the group.

A generated document comprising a portion identified to be of interest to a group of social network members may be accessible to the entire group of members. In one such embodiment, the generated document may be accessible to the group of members to the exclusion of other members of the social network. In another such embodiment the generated document may be password protected with a password accessible to the members of the group.

A further illustrative embodiment comprises prompting attention to a portion of a document. One such embodiment comprises identifying a document associated with a first member of a social network. The document may comprise a portion that is dynamically updated with content. The method may comprise identifying interest information for the first member, and prompting attention to the portion based, at least in part, on the interest information. The identification of interest information for the first member may comprise any suitable identification. Examples include accessing a member profile for the first member, accessing a plurality of member profiles associated with a plurality of social network members associated with the first member, and identifying a plurality of portions that are dynamically updated with content on documents associated with a plurality of social network members associated with the first member.

Prompting attention to the portion may comprise suggesting removal of the portion from the document, alteration of the portion, automatically removing the portion from the document, or other prompt or action. In one example, if the prompting of attention may comprise suggesting removal or a similar action, removing the portion from the document may be carried out if a direction to remove the portion has been received from the first member. In a different embodiment, attention may be prompted to the portion by highlighting the portion on a user interface visible to the first member.

This further illustrative embodiment may also comprise determining a rating for the portion based, at least in part, on the interest information. The first member, or other entity, may be provided a suggestion associated with the portion based, at least in part, on the rating. For example, a portion may be determined to be highly rated if a certain threshold number or percentage of a plurality of accessed documents associated with the first member comprises the particular portion. Additionally, or alternatively, a portion may be associated with a high rating if it has experienced a high rate of addition to a number of a plurality of other social network members' personalized documents.

The first member may be alerted to a rise or fall in the rating of the portion on his or her personalized document. A rating may comprise, for example, a rating of popularity, and may indicate the unpopularity of a portion in addition to indicating popularity. For example, in one embodiment, a portion may be rated on a scale of 0-100, where a rating of "0" indicates a very unpopular portion, and a rating of "100" indicates an extremely popular portion. In one such embodiment, a numeric indicator corresponding to the rating of the portion may be output proximate the portion on the document to the first member. The first member may then be able to view easily the popularity of the portions) on his or her document.

In another embodiment, a portion identified on the first member's document may be suggested for removal or automatically removed by a social network engine. For example, the first member may have an entry in his or her profile data listing his hometown as Tuscaloosa, Alabama. If the social network profile for the first member also indicates that he or she recently moved to Tuscaloosa from Cheyenne, Wyoming, the processor may suggest the removal of a portion that provides a dynamically updated weather forecast for Cheyenne. In one such embodiment, the social network engine may also suggest the member add an alternative portion that provides a current weather forecast for the Tuscaloosa, Alabama area, as well as a portion generated by the Tuscaloosa chamber of commerce that provides a community events calendar for Tuscaloosa and the surrounding area.

An operator of a server hosting a social network and/or documents comprising portions that are dynamically updated with content may find it useful to output advertisements with the documents and/or the portions. One embodiment of the present invention may comprise generating an advertisement associated with a member's document, and/or with a portion thereon. The generated advertisement may then be output with the document and/or the portion to the member who selected the portions for the document, or to other members that request access to the document. For example, if a first member's document comprises a portion that provides show time and ticket information a local movie theater, a movie trailer advertisement for a movie being shown at that particular theater may be output with the document when the first member or one of his friends accesses his or her document.

Certain embodiments of the present invention may operate outside of a social network setting. For example, one such embodiment may comprise providing a selectable plurality of portions comprising dynamically updated content, generating a document comprising at least one of the selectable plurality of portions, and receiving a request signal from an entity unassociated with the document. The request signal may comprise a request for access to the document. For example, if a first user is associated with a portal page document comprising portions) selected by the first user, other users in communication with a network (such as the Internet) may be considered unassociated with the document, and may generate a request signal. Access may then be provided to the entity unassociated with the document, and/or the generated document may then be output to the entity unassociated with the document.

Figure 3:
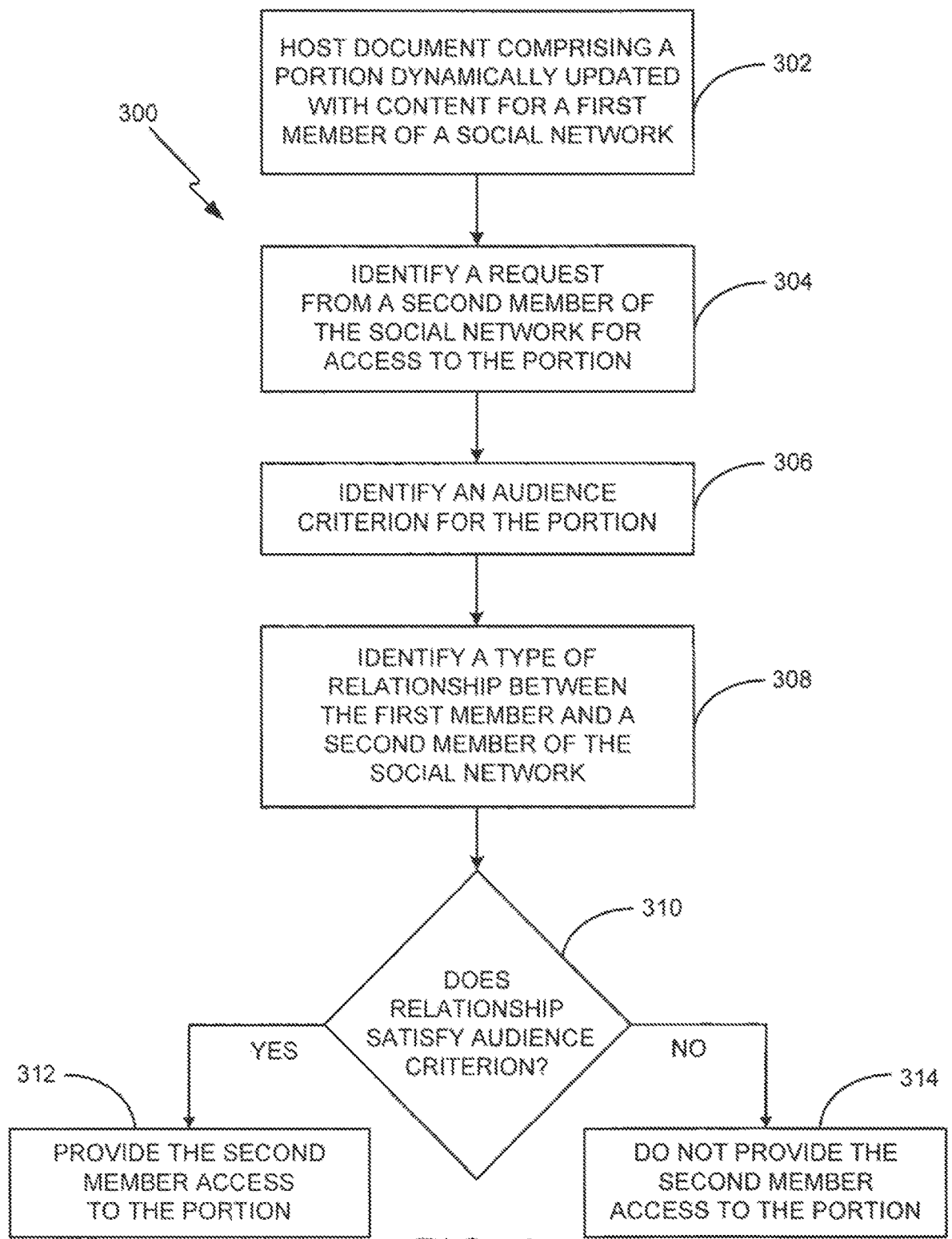
FIG. 3 shows a flow diagram of a method according to one embodiment of the present invention.
Figure 4:
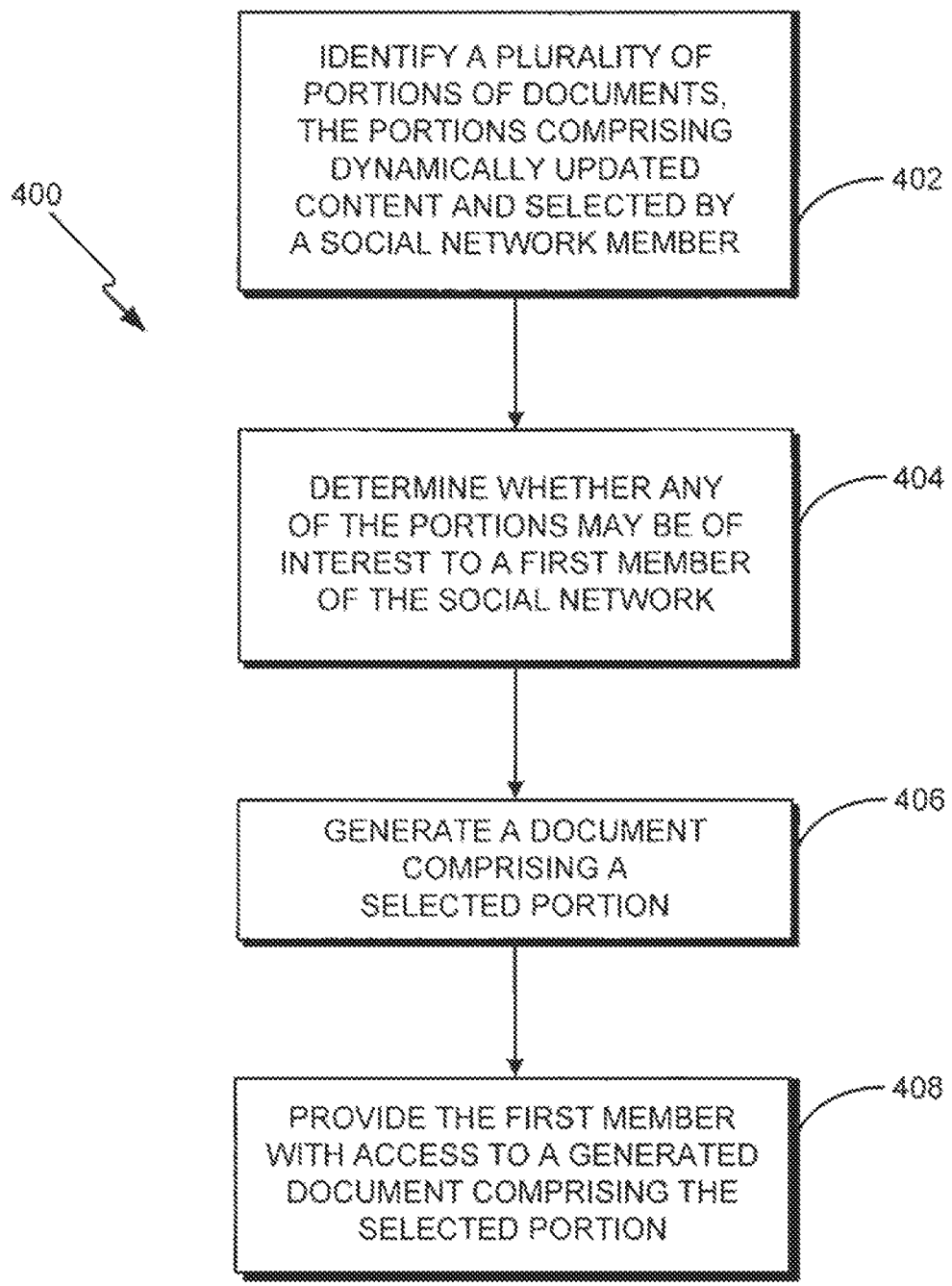
FIG. 4 shows a flow diagram of a method according to another embodiment of the present invention.
Figure 5:
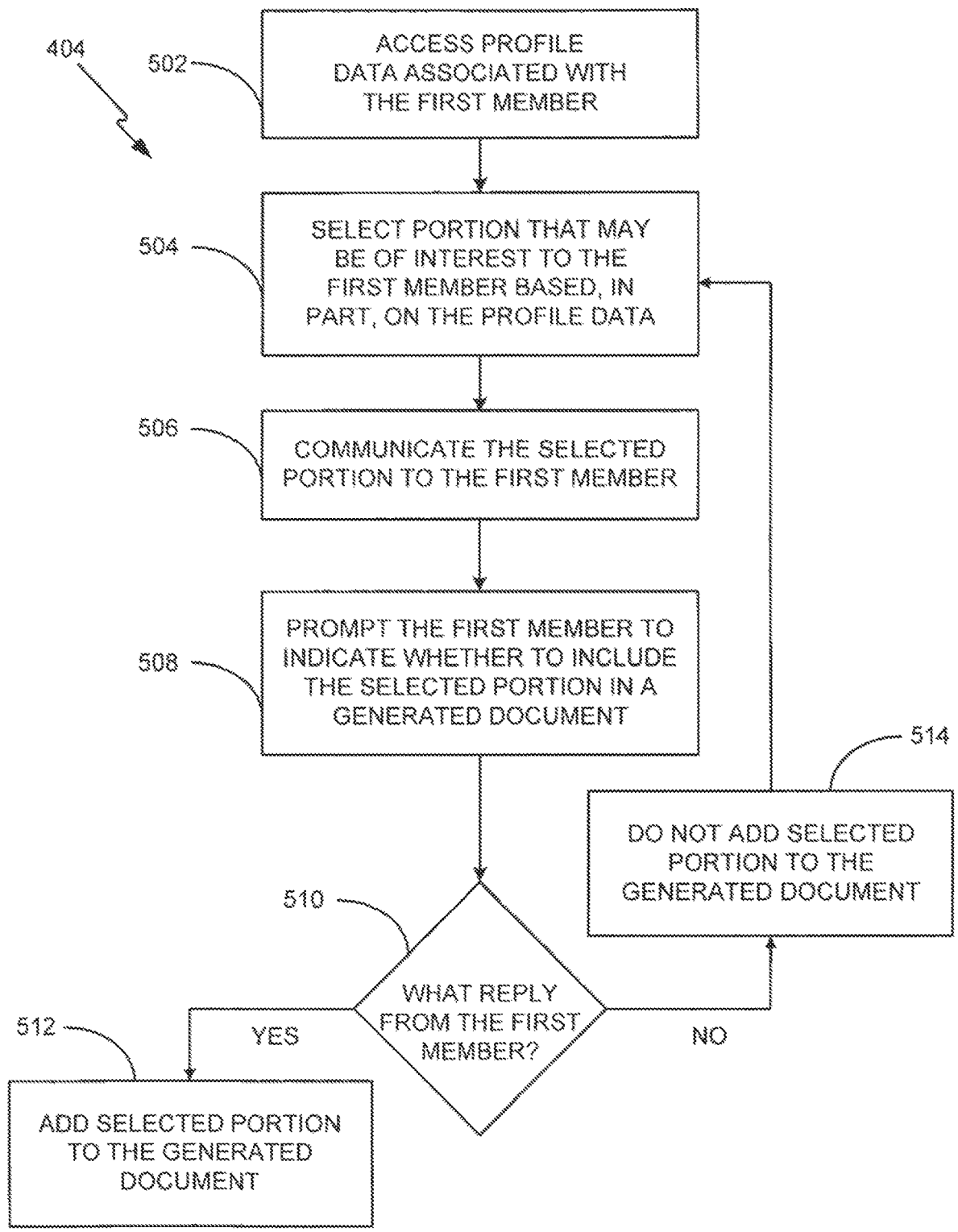
FIG. 5 shows a flow diagram of a subroutine of the method of FIG. 4 for determining whether a portion may be of interest to a first social network member according to one embodiment of the present invention.
Figure 6:
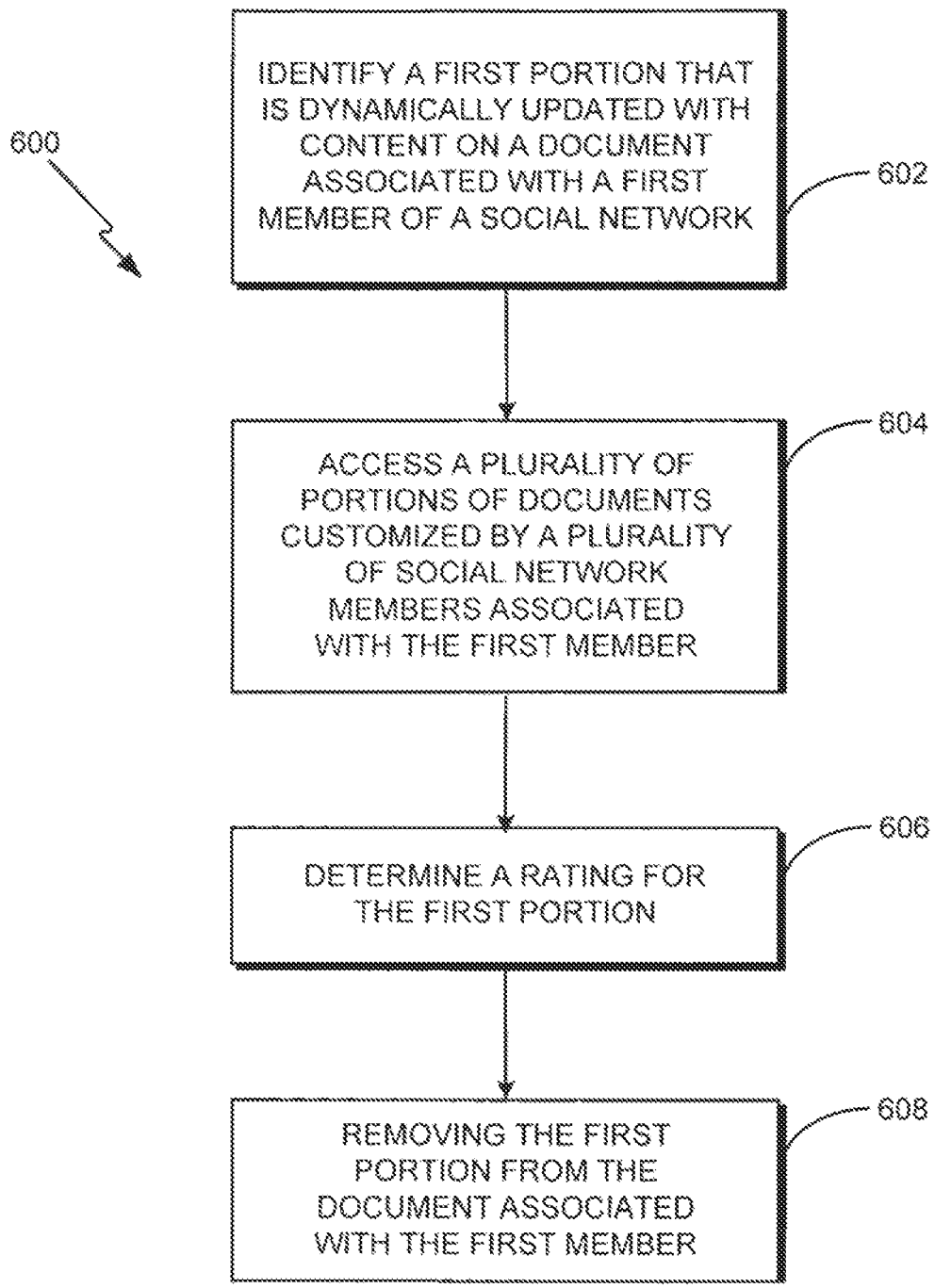
FIG. 6 shows a flow diagram of a method according to another embodiment of the present invention.

Referring again to the drawings, in which like numerals indicate like elements throughout the several figures, FIG. 3 shows a flow diagram of a method according to one embodiment of the present invention. FIG. 3 shows a method 300 for providing access to a document comprising a portion that is dynamically updated with content in accordance with one embodiment of the invention. This illustrative method 300 is provided by way of example, as there are a variety of ways to carry out methods according to the present invention. The method 300 shown in FIG. 3 can be executed or otherwise performed by one or a combination of various systems. The method 300, and the methods described with respect to FIGS. 4 through 6 are described below as carried out by the system 100 shown in FIG. 1 by way of example, and various elements of the system 100 are referenced in explaining the illustrative methods of FIGS. 3-6.

As shown in block 302, the method 300 comprises hosting a document comprising a portion that is dynamically updated with content for a first member, such as the user 112*a*. For example, the server device 104 may host the document for the first member 112*a*. The document may be stored in the social network database 130. The processor device 116 may retrieve the first document, including retrieving updated content for the dynamically updated portion, from the social network database 130 and/or from other devices in communication with the network 106 when a request is received for access to the document.

In one embodiment, the content may comprise third-party content, and may be provided by an entity independent of the server device 104, and independent of the first member 112*a*. For example, in one such embodiment, the dynamically updated content may comprise a weather forecast for the geographic area in which the first member lives. The weather forecast may be provided and updated with new information by a third party, such as by a server device (other than server device 104) in communication with the network 106. In other embodiments, third party content may comprise a wide variety of other suitable types, including sports information, news information, horoscopes, movie times and locations, etc.

The social network engine 120 may then identify a request from an entity other than the first member 112*a* (such as a second member of the social network) for access to at least the dynamically updated portion first member's 112*a* document, as shown in block 304. For example, the social network engine may receive and identify such a request from the second member 112*b*. In one such embodiment, the request may comprise a request signal requesting access to at least the portion of the first member's 112*a* personalized document that is dynamically updated with content.

The method 300 further comprises identifying an audience criterion for the portion of the hosted document, as shown in box 306. In one embodiment, the social network engine 120 may request from the first member 112*a* an audience criterion. For example, the social network engine 120 may generate and output a signal requesting the first member 112*a* to indicate whether he or she would like to restrict access to his or her personalized document, and/or a dynamically updated portion thereon. The first member 112*a* may then determine whom he or she would like to be able to view the personalized document and/or the portion by selecting an appropriate audience criterion. The first member 112*a* may then output the selected audience criterion to the social network engine 120 over the network 106. The social network engine 120 may receive the first member's 112*a* specified audience criterion, and identify the received audience criterion.

In the embodiment shown in FIG. 3, the audience criterion comprises a relationship criterion (such as a specified type of relationship between the first member and the second member). For example, a relationship criterion may comprise a type of relationship between the first and second members such as a friend, a family member, a business associate, a common-interest association, a common-geography association, a member category association, or a relationship through an intermediary. In some embodiments, the audience criterion may comprise a relationship weight, such as a level of relationship specified by the first member, or a level of relationship agreed upon by the first and second members (such as a type of relationship offered by the first member and accepted by the second member).

In yet other embodiments an audience criterion may comprise, for example, an acceptable entity, or a list of acceptable entities, to which the first member's 112*a* personalized document and/or the dynamically updated portion or portions thereon may be output, or to whom access to at least the portions may be provided. An audience criterion may also comprise a list of unacceptable entities, to which the first member's 112*a* personalized document and/or the portions) may not be output, or to whom access to at least the portions may not be provided. In one embodiment, the audience criterion may be stored with other entries and profiled data associated with the first member's 112*a* member profile in the social network database 130.

As shown in box 308, the method 300 further comprises identifying a type of relationship between the first and second members. For example, in one embodiment, the social network engine 120 may access profile data associated with at least one of the first and second members, and may determine the type of relationship based, at least in part, on the accessed profile data. In one such embodiment, the first and second members may each have an entry in their respective member profiles that indicates that they have agreed to a "friend" type of relationship of a "close friend" relationship weight.

The social network engine 120 may then evaluate the identified relationship between the first and second members for satisfaction of the identified audience criterion as shown in box 310. If the type of relationship signal satisfies the audience criterion, the social network engine 120 may provide access to at least the portions) of the document to the second member, as shown in box 312. If the type of relationship does not satisfy the audience criterion, the social network engine 120 will not provide access to at least the portion(s) of the document to the second member as shown in box 314.

For example, the audience criterion may comprise a relationship criterion specified by the first member (such as a list of three acceptable entities that may be provided access to at least the portions) comprising dynamically updated content of the document hosted for the first member). If a request signal received by the social network engine 120 for access to at least the portions) of the document is evaluated for satisfaction of this illustrative audience criterion originates from an entity other than one of the three acceptable entities specified, the social network engine 120 will not provide access to the portions) of the first member's 112*a* document to the entity requesting to view it, as shown in box 314. If the request signal did originate from one of the three specified entities, access to at least the portion(s) of the hosted document may be granted, as shown in box 312.

Referring now to FIG. 4, a method 400 according to another embodiment of the present invention is shown. The method 400 comprises a method for generating a document comprising a portion that may be of interest to a first member 112*a* of a social network. As shown in block 402, the method 400 comprises identifying a plurality of portions of documents that have been selected by at least one social network member. The identified portions each comprise dynamically updated content. A server device 104 may host the social network. A social network engine 120 may administer the social network.

In one embodiment, the portions identified may comprise portions of documents associated with social network friends or contacts of a first member of the social network (such as user 112*a*). In one such embodiment, the social network engine 120 may search the social network member profiles of members associated with the first member 112*a* for the presence of documents. For example, the social network engine 120 may identify whether the member profiles of those members of the social network that are within one degree of separation from the first member 112*a* comprise documents that include portions that comprise dynamically updated content.

In another embodiment, the portions identified may comprise portions of documents associated with a group of social network members, such as a social network community. In one such embodiment, the social network engine 120 may search the social network member profiles of all those members who belong to at least one of the same social network communities as the first member 112*a* for the presence of documents that include at least one portion, and identify any such documents. The plurality of identified portions of documents may comprise a wide variety of different types of suitable dynamically updated content. For example, one of the documents may comprise a news information portion, an up-to-date sports score information portion, a current movie information portion, and a daily horoscope portion that may each be identified by the social network engine 120.

As shown in block 404, the method 400 further comprises determining whether any of the identified portions may be of interest to a first member of the social network (such as user 112*a*). The social network engine 120 may determine whether at least one portion from among the plurality of portions identified may fit with any of the stated interests, goals, contacts, etc., of the first member. A portion that is determined to be of interest to the first member may comprise, for example, a portion that is popular among the plurality of identified portions of documents, and/or a portion favored by other social network members with entries in their member profiles similar to entries in the first member's 112*a* member profile. In one embodiment, the social network engine 120 may determine whether a portion may be of interest to the first member 112*a* according to the subroutine 404 as described below with respect to FIG. 5.

Referring still to FIG. 4, after identifying at least one portion that may be of interest to the member the social network engine 120 may generate a document comprising the selected portion or portions determined to be of interest to the first member, as shown in block 406. The generated document may also comprise information about the first member 112*a*. Information about the first member 112*a* may be extracted from profile data in the user's 112*a* social network member profile. The social network engine 120 may generate Hypertext Markup Language (HTML) code comprising data indicating the at least one selected portion, and/or information about the first member 112*a*. The generated document may comprise, for example, a personalized HTML portal page viewable using a web browser application, and associated with the first member's 112*a* viewable member profile on the social network. The portion or portions on the first member's 112*a* customized document may be updated in real-time with the availability of new information on the network 106. For example, the social network engine 120 may receive updated content from an associated content provider, and may automatically generate and output new HTML code to reflect the updated information.

The method 400 further comprises providing the first member 112*a* with access to the generated document, as shown in box 408. For example, the social network engine 120 may output the document over the network 106 to the first member 112*a*, or to another social network member who requests, and is permitted access to the generated document. In one embodiment, the generated document may be provided in response to a request signal comprising a request for access to the generated document from a social network member. For example, a social network member 112*b* may be viewing the first member's 112*a* social network member profile, and note the presence of a generated document including portions customized by the first member 112*a* comprising the user's 112*a* personal choices for which portion or portions are included in the document. The requesting member 112*b* may generate a request signal in one such embodiment by clicking a hyperlink on a user interface associated with viewing the first member's 112*a* document. The social network engine 120 may receive the request signal and determine someone has requested access to the first member's 112*a* personalized generated document.

In one embodiment, the social network engine 120 may output the generated document over the network 106 to a client device, such as the client device 102*b* associated with the requesting member 112*b*. In one embodiment, the document may be output as an HTTP article that may be viewed on a user interface in communication with a requesting social network member's 112*b* client device 102*b*. In some embodiments, the generated document may only be output upon the request signal's satisfaction of an audience criterion. In one such embodiment, the generated document comprising the selected portion or portions may be provided as described by the method 300 shown in FIG. 3.

Referring now to FIG. 5, a flow diagram of a subroutine 404 of the method of FIG. 4 for identifying a portion that may be of interest to a social network member according to one embodiment of the present invention is shown. As shown in block 502, the subroutine 404 comprises accessing profile data associated with the first member 112*a* (such as by accessing the member profile of the first member 112*a*). The first member's 112*a* profile data may be stored, for example, in a social network database 130. The social network engine 120 may note the existence of personal information contained in profile data entries associated with the first member 112*a*. Personal information may comprise, for instance, information associated with the first member's 112*a* background information, address, interests, hobbies, etc. The social network engine 120 may also access a document customized by the first member 112*a*. For example, the first member 112*a* may have previously customized and/or personalized a document by, for example, adding or removing a portion that is dynamically updated with content to or from the document.

As shown in block 504, the subroutine 404 further comprises selecting a portion that may be of interest to the first member 112*a* based, at least in part, on the accessed profile data. In one embodiment, the social network engine 120 may select a portion that may be of interest to the first member 112*a* by comparing entries in the first member's 112*a* profile data with entries in a plurality of other social network members' profile data. The social network engine 120 may then select a portion that is popular among documents associated with the plurality of other social network members that have entries in their respective member profiles that are similar to entries contained in the first member's 112*a* member profile In another embodiment, the social network engine 120 may select portions that may be of interest to the first member 112*a* by noting similarities between the entries in the user's 112*a* social network member profile and the type and content of the dynamic content provided by a portion. For example, the social network engine 120 may note that a portion that provides background and schedule information, as well as ticket prices, for live music venues in and around the Kansas City metropolitan area. The social network engine 120 may then associate this information with the fact that the first member 112*a* has provided an entry in his or her member profile that specifies a hometown of Kansas City, Missouri.

In yet another embodiment, a portion may be of interest to the first member 112*a* if it is common to a certain predetermined number or percentage of a set of identified documents. Information from the user's 112*a* social network member profile may be used to ascertain which portions among those on the identified documents may be of interest to the first member 112*a*.

Referring still to FIG. 5, the social network engine 120 may then prompt the first member 112*a* to indicate whether to include the selected portion (or portions) in a generated document, as shown in box 508. For example, the social network engine 120 may generate and output to the first member 112*a* a suggestion signal, such as an email message comprising two hyperlinks. A first hyperlink may be associated with adding the selected portion. A second hyperlink may be associated with not taking the suggested action of adding the selected portion.

The first member 112*a* may then reply to the prompt, as shown in box 510. For example, the first member 112*a* may click on one of the above-mentioned hyperlinks displayed in a user interface, thereby indicating to the social network engine 120 either to include or not include the selected portion in the generated document.

If the first member 112*a* wishes to include the selected portion in his or her personalized social network document, the social network engine 120 may add it to the first member's 112*a* generated document, as shown in box 512. If the first member 112*a* does not wish to include the selected portion in his or her personalized document, he or she may so indicate. If the user declines to add the selected portion, the social network engine 120 will not add it to the first member's 112*a* document as shown in box 514.

The social network engine 120 may then again select a different portion that may be of interest to the first member 112*a* based, in part, on the profile data, as shown in box 504. As such, the illustrative embodiment shown by subroutine 404 may be iterative in nature, and capable of numerous repetitions. In one embodiment, the social network engine 120 may end the process of determining whether portions may be of interest to the first member 112*a* after he or she has declined to include a selected portion or portions a predetermined number of times.

FIG. 6 shows a flow diagram of a method 600 according to another embodiment of the present invention. The method 600 comprises a method for rating and removing a portion that is dynamically updated with content from a document associated with a first member of a social network in accordance with one embodiment of the present invention.

As shown in box 602, the method 600 comprises identifying a first portion that is dynamically updated with content on the document associated with the first member of the social network. In one embodiment, the first member (such as the user 112*a*) may have previously customized the document with his or her choices for which portions that provide dynamically updated content to include. For example, the social network engine 120 may identify all of the portions included on the first member's 112*a* document.

The method 600 further comprises accessing a plurality of portions that provide dynamically updated content of documents customized by a plurality of social network members associated with the first member 112*a*, as shown in box 604. In one embodiment, accessing the plurality of portions may comprise accessing profile data and/or other entries in the member profiles associated with the plurality of members associated with the first member 112*a*. In one such embodiment, this may comprise accessing the customized documents that include the plurality of portions, and/or accessing an entry (or entries) associated with the member profile. For example, a social network may have a plurality of members, and each member may have his or her own member profile and a customized document that includes at least one portion that is dynamically updated with content that is associated with his or her member profile. The social network engine 120 may access a plurality of such social network member profiles. The accessed social network profiles may be stored in the social network database 130.

In one example, the social network engine 120 may access the portions of documents customized by at least some of the social network members who belong to a social network member association (such as a community or group) that the first member 112*a* also belongs to, and/or access the member profiles associated with the accessed portions. A social network member association may comprise, for example, a group of social network members that have voluntarily joined other social network members who share a hobby or live in a common geographic area. In another embodiment, the social network engine 120 may access a plurality of portions of documents customized by a plurality of social network members within one degree of separation from the first member 112*a*, and/or access the member profiles associated with the accessed portions.

Still referring to FIG. 6, the method 600 further comprises determining a rating for the first portion, as shown in box 606. In one embodiment, the rating may be based, at least in part, on the plurality of accessed portions of documents customized by the plurality of members associated with the first member 112*a*. For example, the social network engine 120 may determine a percentage of other members of a member association to which the first member 112*a* belongs that have or have not customized their respective documents with the first portion. In another embodiment, the social network engine 120 may determine the rating based, at least in part, on the number of members within two degrees of separation from the first member 112*a* who have customized their respective documents with the first portion.

In one embodiment, the social network engine 120 may access profile data (such as member profiles) associated with a plurality of members of the social network who are associated with the first member 112*a*. In one such embodiment, a rating may be based, at least in part, on the number and/or percentage of those members with similar entries in their member profiles as the first member 112*a* that have/have not customized their respective documents with the first portion that the first member 112*a* has selected.

In another embodiment, the rating may be based, at least in part, on interest information associated with the first member 112*a* that has been identified by the social network engine 120. For example, in one such embodiment, the interest information may be determined by accessing profile data associated with the first member 112*a* (such as by logging entries in the first member's 112*a* member profile and comparing these entries with a table of suggested portions that are available to members of the social network, wherein each such portion provides a distinct dynamically updated stream of content).

The method 600 further comprises removing the first portion from the document associated with the first member 112*a*, as shown in box 608. For example, in one embodiment, the social network engine 120 may automatically remove the first portion if the rating determined for the first portion does not exceed a predetermined threshold rating. In another embodiment, the social network engine 120 may provide a suggestion associated with the first portion to the first member 112*a*. In one such embodiment, the suggestion may comprise a suggestion to remove the first portion from the first member's 112*a* customized document. The social network engine 120 may then determine whether the first member 112*a* has provided a direction to remove the first portion in response to receiving the suggestion, and may remove the first portion if such a direction has been received.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A computer implemented method comprising:
   hosting, by one or more processors, on a social networking platform, a document uploaded by a first user of the social networking platform, wherein the document comprises a first portion and a second portion comprising dynamic content that is accessible for a particular duration;
   receiving, by the one or more processors, from a device corresponding to the first user and for the uploaded document, relationship-based content access criterion for defining access restrictions for a plurality of users, to the second portion of the uploaded document that comprises the dynamic content;
   receiving, by the one or more processors and from a device corresponding to a second user of the social networking platform, a request, to access the document uploaded by the first user;
   obtaining, by the one or more processors, relationship data for the second user on the social networking platform, the relationship data defining a type of relationship that exists on the social network between the first user and the second user of the social network;
   determining, by the one or more processors, based on the relationship data defining the type of relationship between the first user and the second user, that the second user satisfy the relationship-based content access criterion for the uploaded document; and
   providing, by the one or more processors, for display on the device corresponding to the second user, the uploaded document with access to the first portion and a prompt to be displayed by a user interface of the device requesting an indication of whether the second portion of the document is to be displayed.

2. The computer-implemented method of claim 1, further comprising:
   receiving a request from a device corresponding to a third user of the social networking platform to access the document uploaded by the first user;
   determining, based on the relationship data for the third user, that the third user satisfies the relationship-based content access criterion for the uploaded document; and
   in response to determining that the third user satisfies the relationship-based content access criterion for the uploaded document, providing, for presentation to the device corresponding to the third user, the document with unrestricted access to the first portion and the second portion.

3. The computer-implemented method of claim 1, wherein the relationship-based content access criterion specifies a restriction to access to the second portion of the document to user who have a relationship on the social networking platform with the first user.

4. The computer-implemented method of claim 3, wherein the relationship-based content access criterion restricts access to the second portion of the document to users of the social networking platform that have a common-interest association or a member group association with the first user.

5. The computer implemented method of claim 1, wherein the relationship-based content access criterion restricts access to the second portion of the document to user of the social networking platform that have one or more relationships with the first user: friend, co-worker, family member, business associate, common-geography association, or an intermediary relationship.

6. The computer implemented method of claim 1, wherein the dynamic content is generated and provided by a third party information provider.

7. The computer-implemented method of claim 1, wherein the dynamic content includes one or more of weather information, sports information, a movie listing, entertainment information, financial market information, news information.

8. A system comprising:
   one or more processors; and
   a memory storing instructions that, when executed by the one or more processors, cause the system to perform operations comprising:
      hosting on a social networking platform, a document uploaded by a first user of the social networking platform, wherein the document comprises a first portion and a second portion comprising dynamic content that is accessible for a particular duration;
      receiving from a device corresponding to the first user and for the uploaded document, relationship-based content access criterion for defining access restrictions for a plurality of users, to the second portion of the uploaded document that comprises the dynamic content;
      receiving, by the one or more processors and from a device corresponding to a second user of the social networking platform, a request, to access the document uploaded by the first user;
      obtaining relationship data for the second user on the social networking platform, the relationship data defining a type of relationship that exists on the social network between the first user and the second user of the social network;
      determining based on the relationship data defining the type of relationship between the first user and the second user, that the second user satisfy the relationship-based content access criterion for the uploaded document; and providing for display on the device corresponding to the second user, the uploaded document with access to the first portion and a prompt to be displayed by a user interface of the device requesting an indication of whether the second portion of the document is to be displayed.

9. The system of claim 8, wherein the instructions that, when executed by the one or more processors, cause the system to perform operations comprising:

receiving a request from a device corresponding to a third user of the social networking platform to access the document uploaded by the first user;

determining, based on the relationship data for the third user, that the third user satisfies the relationship-based content access criterion for the uploaded document; and in response to determining that the third user satisfies the relationship-based content access criterion for the uploaded document, providing, for presentation to the device corresponding to the third user, the document with unrestricted access to the first portion and the second portion.

10. The system of claim 8, wherein the relationship-based content access criterion specifies a restriction to access to the second portion of the document to user who have a relationship on the social networking platform with the first user.

11. The system of claim 8, wherein the relationship-based content access criterion restricts access to the second portion of the document to users of the social networking platform that have a common-interest association or a member group association with the first user.

12. The system of claim 8, wherein the relationship-based content access criterion restricts access to the second portion of the document to user of the social networking platform that have one or more relationships with the first user: friend, co-worker, family member, business associate, common-geography association, or an intermediary relationship.

13. The system of claim 8, wherein the dynamic content is generated and provided by a third party information provider.

14. The system of claim 8, wherein the dynamic content includes one or more of weather information, sports information, a movie listing, entertainment information, financial market information, news information.

15. A non-transitory computer readable medium including instructions that, when executed by one or more processors, causes performance of operations comprising:

hosting on a social networking platform, a document uploaded by a first user of the social networking platform, wherein the document comprises a first portion and a second portion comprising dynamic content that is accessible for a particular duration;

receiving from a device corresponding to the first user and for the uploaded document, relationship-based content access criterion for defining access restrictions for a plurality of users, to the second portion of the uploaded document that comprises the dynamic content;

receiving, by the one or more processors and from a device corresponding to a second user of the social networking platform, a request, to access the document uploaded by the first user;

obtaining relationship data for the second user on the social networking platform, the relationship data defining a type of relationship that exists on the social network between the first user and the second user of the social network;

determining based on the relationship data defining the type of relationship between the first user and the second user, that the second user satisfy the relationship-based content access criterion for the uploaded document; and providing for display on the device corresponding to the second user, the uploaded document with access to the first portion and a prompt to be displayed by a user interface of the device requesting an indication of whether the second portion of the document is to be displayed.

16. The non-transitory computer readable medium of claim 15, wherein the instructions that, when executed by one or more processors, causes performance of operations comprising:

receiving a request from a device corresponding to a third user of the social networking platform to access the document uploaded by the first user;

determining, based on the relationship data for the third user, that the third user satisfies the relationship-based content access criterion for the uploaded document; and in response to determining that the third user satisfies the relationship-based content access criterion for the uploaded document, providing, for presentation to the device corresponding to the third user, the document with unrestricted access to the first portion and the second portion.

17. The non-transitory computer readable medium of claim 15, wherein the relationship-based content access criterion specifies a restriction to access to the second portion of the document to user who have a relationship on the social networking platform with the first user.

18. The non-transitory computer readable medium of claim 15, wherein the relationship-based content access criterion restricts access to the second portion of the document to users of the social networking platform that have a common-interest association or a member group association with the first user.

19. The non-transitory computer readable medium of claim 15, wherein the dynamic content is generated and provided by a third party information provider and includes one or more of weather information, sports information, a movie listing, entertainment information, financial market information, news information.

20. The non-transitory computer readable medium of claim 15, wherein the relationship-based content access criterion restricts access to the second portion of the document to user of the social networking platform that have one or more relationships with the first user: friend, co-worker, family member, business associate, common-geography association, or an intermediary relationship.

* * * * *